INVENTOR.
Henry M. Brizzolara

United States Patent Office 3,452,631
Patented July 1, 1969

3,452,631
REEFING LINE CUTTER
Henry M. Brizzolara, Allentown, Pa., assignor to Atlas Chemical Industries, Inc., Wilmington, Del., a corporation of Delaware
Filed Apr. 17, 1967, Ser. No. 631,546
Int. Cl. B64d 1/12, 17/00, 25/00
U.S. Cl. 83—444                         10 Claims

ABSTRACT OF THE DISCLOSURE

A parachute reefing line cutter wherein a sleeve-like member is disposed in fixed position in the cutter between two oppositely disposed openings located between a shearing element and an anvil. The sleeve-like member may be conveniently formed of severable material and receives a reefing line therethrough which may be severed even when maintained under zero tension.

---

This invention relates to explosively activated cutting devices and more particularly to a device for cutting reefing lines even when maintained under zero tension on a parachute or for related application.

Use of parachuets either for air dropping articles or decelerating aircraft requires incorporation of suitable means to regulate the opening of the parachute. Typically, reefing lines are employed to control and regulate the opening of such parachuetes. According to conventional practice, a plurality of reefing lines are looped around the parachute skirt to limit full inflation of the parachute at the start of the deployment. After a time delay insuring a sufficient decrease in the initial velocity of the parachute and its load, the reefing lines are released to allow full opening of the parachute. By cutting the reefing lines in predetermined fashion, the opening of the parachute may be thus regulated.

While various methods for releasing a parachute after a desired period of free fall have been proposed, perhaps the most promising and practical device is a reefing line cutter carried on the reefing line and adapted to cut the line when actuated by an explosive charge.

Cutting devices for reefing lines must, for satisfactory operation, include time delay means whereby sequential cutting of the reefing lines may be effected in response to a single triggering action. This triggering action may be obtained when the shroud lines connecting the parachute with the object are first drawn taut. A suitable cutter for this purpose must also be highly dependable in operation since failure of one of the cutters will destroy the effectiveness of the parachute in safely reducing the speed of the attached object. It is also important that the cutter effectively sever a reefing line even when maintained under zero tension. Heretofore, reefing lines which are generally constructed of extremely fine nylon threads, have been effectively severed in conventional reefing line cutters when maintained under about fifteen pounds tension. However, when such lines are under zero tensions, binding of the fine nylon threads has occurred in the cutter resulting in incomplete severing and hold-up of the reefing line. Thus, the explosive cutters for reefing lines employed heretofore have been very unreliable in operation for severing a reefing line under zero tension.

The present invention generally provides a reefing line cutter wherein a sleeve-like member is disposed in fixed position in the cutter between two oppositely disposed openings located between a shearing element or knife blade of any desired configuration and an anvil. The knife blade which is generally stairght edged is carried on a slidable piston within the cutter and arranged to move from a retracted position from the anvil to a reefing line cutting position adjacent the anvil. The piston, held in retracted position by for example, a shear pin, is violently propelled against the anvil by gases generated from an actuated explosive assembly which may include a primer charge, a delay train, and a propelling explosive charge. A spring actuated striking pin may be used to initiate the primer charge. Thus, by releasing the spring actuated striking pin, the explosive assembly is actuated, the piston is propelled forward and severs the sleeve-like member containing the reefing line as it assumes a position adjacent the anvil.

Generally stated therefore, the present invention provides a reefing line cutter which includes a shearing element moveably disposed in a casing and propelled by an explosive type actuator within the casing into shearing relationship with an anvil, and a sleeve-like member positioned through the casing and intermediate the shearing element and the anvil for containing a reefing line to be severed.

The present invention will become more apparent from the following detailed description taken with regard to the accompanying drawing in which like numerals represent the same elements throughout the several views.

Figure 1:
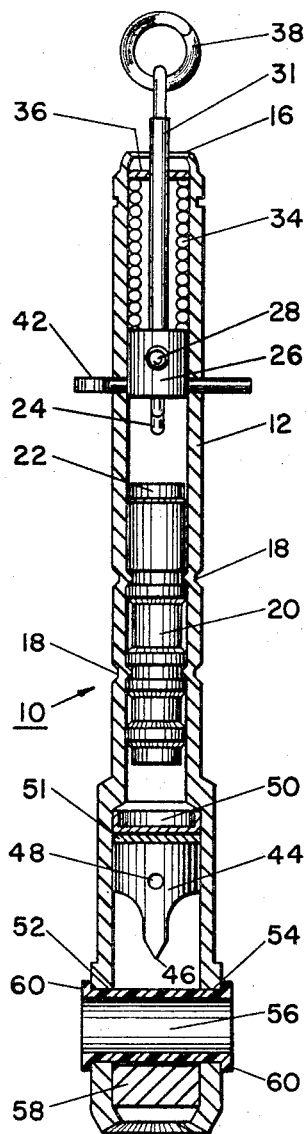
FIG. 1 is a partial half front elevational view of the cutter of the present invention.
Figure 3:
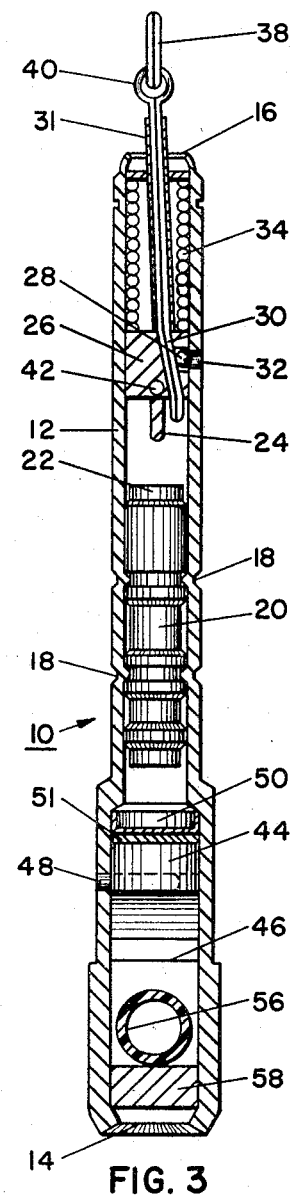
FIG. 3 is partial half side elevational view further illustrating the cutter of FIG. 1.
Figure 2:
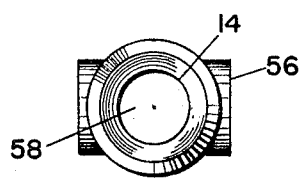
FIG. 2 is an end view of the cutter of FIG. 1.

Referring to FIGS. 1–3 of the drawing, reefing line cutter 10 includes cylindrical casing 12 of suitable material such as aluminum. The cylindrical casing 12 may be open at opposite ends 14 and 16 and internally threaded or crimped 18 to receive the shell of explosive actuator assembly 20.

Explosive actuator assembly 20 may be any known type, but the one illustrated and preferred is of the time delay type. Such an assembly includes a propelling explosive charge, a delay powder charge, and a primer charge. The primer charge is disposed near one end 22 of the assembly and is of the impact ignition type requiring only the use of a spring-loaded firing pin 24 on firing piston 26 to initiate the operation of the cutter. Firing pin 24 is held in the retracted position by means of ball detent 28 and rod type lanyard 30. Desirably, the rod type lanyard is held in position within sleeve liner 31 formed of a suitable plastic which insures limited frictional drag during withdrawal of the lanyard from locking position. The lanyard holds ball detent 28 in wedged engagement with piston 26 and casing hole 32 so long as the lanyard is inserted in a bore hole through firing piston 26. By moving lanyard 30, ball detent 28 is allowed to roll into an opening of the bore hole through firing piston 26 which action releases the piston 26. Pin 24 of firing piston 26 is forced into engagement with primer charge 22 by the action of spring 34 illustrated compressed between firing piston 26 and retaining wall 36. Pull loop 38 passed through loop 40 of lanyard 30 may be attached to a pull means for triggering the reefing line cutter for deployment of a parachute. Safety pin 42 may be passed through firing piston 26 to insure against accidental triggering of the reefing line cutter if desired. Safety pin 42 may be an ordinary cutter pin inserted transversely through firing piston 26 so as to engage opposite sides of casing 12.

Shearing element illustrated as piston 44 is formed with straight knife edge cutting blade 46 although other blade configurations may be also suitably employed. The length of the straight knife edge cutting blade may be approximately that of the inner diameter of casing 12 or longer and is desirably formed of a hard sharpened material so that it will effectively sever reefing lines. Piston 44 is held by shear pin 48 or related temporary piston holding means such as a wedge member to assure proper rotational position relative to reefing lines to be severed when piston 44 is in retracted position. During the cutting stroke of the piston, shear pin 48 is broken as the piston is projected by the actuated explosive assembly.

Desirably, shear pin 48 is designed to fail only after the force applied on piston 44 is at least sufficient to completely sever the reefing lines. Thus, the gas generated by the explosive assembly 20 causes shear pin 48 to fail after a predetermined pressure has been built up and with ample energy to almost instantaneously accelerate blade 46 to a high velocity for the cutting step.

Due to the relative short stroke required by the piston to complete the cutting operation coupled with the high acceleration rate thereof, once released by shear pin 48, there is little or no opportunity for the blade to rotate from the initial retracted position. If desired, piston 44 may be keyed to casing 12 such as by a tongue and groove arrangement to prevent rotational movement of the knife blade during the cutting stroke. However, such a keyed arrangement tends to increase the frictional drag of piston 44 and is generally not necessary.

Gas seal 50 is disposed within casing 12 intermediate explosive assembly 20 and insulation seal 51 adjacent piston 44. The gas seal may be placed around the periphery of inner surface of the casing to insure an effective gas seal and efficient propelling of piston 44 by the generated gas from the actuated explosive assembly. Both gas seal 50 and insulation seal 51 may be formed of any suitable material as desired.

Disposed within casing openings 52 and 54 is sleeve-like member 56 which forms the essence of the present invention. Sleeve-like member 56 is secured in positioned intermediate blade 46 and anvil 58 while suitably secured inside casing 12 near one end thereof. Desirably, the sleeve-like member 56 is in contact or flush with the surface of anvil 58 to insure effective severing of reefing lines received within the sleeve-like member. The internal diameter of the sleeve-like member may be narrower than the width of knife blade 46.

By employing the sleeve-like member 56, it is found that when a reefing line is under zero tension, effective and complete severing of the reefing line results. In the absence of the sleeve-like member, strands of reefing line under zero tension typically bind between knife blade 46 and the inner surface of casing 12. Ineffective severing also results in the absence of the sleeve-like member since a reefing line under zero tension may not be adjacent the surface of an anvil. Inclusion of the sleeve-like member in the cutter of the present invention eliminates these difficulties.

Sleeve-like member 56 is formed of an elastic rubber or elastic plastic material readily severed by blade 46. Elastic materials are desired since a pre-formed sleeve-like member may be readily inserted in position within casing openings 52 and 54 and supported therein by flanges 60 about the edges of the sleeve-like member. Typically, the flanges 60 are constructed such to line the outer configuration formed by casing openings 52 and 54 to fix the sleeve-like member in position. Thermoplastic materials are particularly useful for preparing the sleeve-like member since they generally possess favorable properties and may be economically formed. Useful thermoplastic materials include materials such as polyvinyl resin, polyvinyl chloride, polystyrene, polyethylene, polypropylene, and cellulose and acrylic containing resins. Copolymers of these materials along with other materials such as plasticized vinyl chloride-vinyl acetate copolymers are also useful as are related terpolymers exemplified by acrylonitrile-butadiene-styrene terpolymer. Various natural and synthetic rubbers may also be employed.

In operation, safety pin 42 is initially removed from locking position and the explosive reefing line cutter 10 is ready for use. A static line secured to a convenient location and attached to ring 38 pulls lanyard 30. The pull of the lanyard 30 acts to release the firing piston 26 which is forced by spring 34 into primer charge 22. Firing pin 24 sets off the primer charge which ignites the delay train in explosive assembly 20. Combustion of the delay train will produce gases which are imprisoned between the assembly and seal 50. As this delay train burns, it will build up, over the delay time, sufficient pressure to force against piston 44 and ultimately upon igniting a propelling explosive charge frees the piston which carries the associated knife blade 46 through sleeve-like member 56 to cut a reefing line disposed therein. The reefing line may be either under tension or under zero tension without affecting complete severing of the reefing line which is performed as blade 46 contacts anvil 58.

The delay train requires a precise number of seconds to burn from one end to the other during which the parachute and object experience free fall. At the end of the burning period, the delay train explodes the propelling explosive charge which propels the piston 46 to sever a reefing line for deployment of the parachute. Although the reefing line cutter of the present invention is primarily intended for use in connection with cutting reefing lines on parachutes, it is obviously useful in any application where it is desired to sever a line element remotely in a dependable and efficient manner a predetermined time interval after actuating the triggering mechanism. The small size and light weight of the present device which makes it suitable for use in severing parachute reefing lines also adds to its general utility.

It is to be understood that the foregoing detailed description is given merely by way of illustration and that many variations may be made therein without departing from the spirit and scope of the invention.

What is claimed is:

1. A reefing line cutter which comprises, a casing having disposed therein a moveable shearing element, an explosive type propelling means, an anvil, and a sleeve-like member, said sleeve-like member positioned through the casing and intermediate the shearing element and the anvil for containing a reefing line to be severed, said explosive type propelling means positioned within the casing and in shearing element propelling position whereby upon explosion said shearing element is propelled against said anvil.

2. The reefing line cutter of claim 1 wherein said shearing element is a piston having a generally straight knife blade projecting therefrom and arranged to move from a retracted position from said anvil to a reefing line cutting position by the blade adjacent the anvil.

3. The reefing line cutter of claim 1 wherein the sleeve-like member is formed as a tube of a severable elastic plastic or rubber material.

4. The reefing line cutter of claim 1 wherein the sleeve-like member is secured within openings transversely of the casing and receives a reefing line.

5. The reefing line cutter of claim 2 wherein the sleeve-like member has an internal diameter less than the length of the straight knife blade.

6. The reefing line cutter of claim 1 wherein a temporary shearing element holding means is positioned between the casing and the shearing element for holding the latter in a retracted and properly aligned position relative to the sleeve-like member.

7. The reefing line cutter of claim 6 wherein the temporary shearing element holding means is a shear pin.

8. The reefing line cutter of claim 1 wherein the propelling means is an explosive type which includes a priming charge, a delay train, and an explosive propelling charge.

9. The reefing line cutter of claim 8 wherein an explosive actuator is included as a part thereof.

10. The reefing line cutter of claim 1 wherein the explosive actuator means includes a firing piston having a pin projecting therefrom, a rod-type lanyard disposed within a sleeve liner, and a firing piston propelling spring whereby upon removal of the lanyard from locking position, the firing piston is propelled into the explosive type propelling means by said spring.

References Cited

UNITED STATES PATENTS 2,616,748  11/1952  Hight.
3,246,396  4/1966  Temple et al. _____ 83—639
3,378,218  4/1968  Robertson et al. _____ 30—277

ANDREW R. JUHASZ, *Primary Examiner.*

F. R. BILINSKY, *Assistant Examiner.*

U.S. Cl. X.R.

30—180; 83—639; 244—152